United States Patent
Seth et al.

(10) Patent No.: US 9,135,271 B1
(45) Date of Patent: Sep. 15, 2015

(54) FINDING SIMILAR CITIES USING GEO-RELATED QUERIES

(71) Applicant: Google Inc., Mountain View, CA (US)

(72) Inventors: Rohan Seth, San Francisco, CA (US);
Joshua J. Sacks, San Carlos, CA (US);
Michele Covell, Palo Alto, CA (US);
Michael Chu, Los Altos Hills, CA (US);
Shumeet Baluja, Leesburg, VA (US);
David Marwood, San Francisco, CA (US)

(73) Assignee: Google Inc., Mountain View, CA (US)

( * ) Notice: Subject to any disclaimer, the term of this patent is extended or adjusted under 35 U.S.C. 154(b) by 133 days.

(21) Appl. No.: 13/959,597

(22) Filed: Aug. 5, 2013

Related U.S. Application Data

(63) Continuation-in-part of application No. 12/965,752, filed on Dec. 10, 2010, now abandoned.

(51) Int. Cl.
G06F 7/00 (2006.01)
G06F 17/30 (2006.01)

(52) U.S. Cl.
CPC ............................. *G06F 17/30241* (2013.01)

(58) Field of Classification Search
None
See application file for complete search history.

(56) References Cited

U.S. PATENT DOCUMENTS

| | | | |
|---|---|---|---|
| 8,041,730 B1 * | 10/2011 | Upstill et al. | 707/769 |
| 8,417,683 B2 * | 4/2013 | Singh | 707/706 |
| 2006/0248035 A1 | 11/2006 | Gendler et al. | |
| 2009/0019028 A1 * | 1/2009 | Norris et al. | 707/5 |
| 2010/0174703 A1 | 7/2010 | Dandekar et al. | |
| 2011/0208763 A1 | 8/2011 | McSherry et al. | |

FOREIGN PATENT DOCUMENTS

WO  WO 2008156600 A1 * 12/2008

* cited by examiner

*Primary Examiner* — Loan T Nguyen
(74) *Attorney, Agent, or Firm* — Dority & Manning, P.A.

(57) ABSTRACT

Methods, systems, and apparatus, including computer programs encoded on a computer-readable storage medium, for providing a method that comprises: determining excess queries over multiple time periods for a given geographic feature, where the geographic feature defines a location; comparing geographic features for similarity based at least in part on the excess queries associated with a respective geographic feature; and for a given target geographic feature, determining one or more similar geographic features based on the comparing.

20 Claims, 7 Drawing Sheets

| City A 302a | Time Period 1 | Time Period 2 | Time Period 3 | Time Period 4 |
|---|---|---|---|---|
| Query | Excess Query Count | Excess Query Count | Excess Query Count | Excess Query Count |
| Q1 | - | - | - | - |
| Q2 | - | - | - | - |
| Q3 | - | - | - | - |
| Q4 | - | - | - | - |
| Q5 | 2,000 | 4,000 | 6,000 | 2,000 |
| Q6 | 500 | 500 | 500 | 500 |
| Q7 | - | - | - | - |
| Q8 | 4,000 | 3,000 | 4,000 | 3,000 |
| Q9 | 100 | 100 | 100 | 100 |
| Q10 | 200 | 200 | 200 | 200 |

Columns: 304a, 304b, 304c, 304d

| City B 302b | Time Period 1 | Time Period 2 | Time Period 3 | Time Period 4 |
|---|---|---|---|---|
| Query | Excess Query Count | Excess Query Count | Excess Query Count | Excess Query Count |
| Q1 | - | - | - | - |
| Q2 | - | - | - | - |
| Q3 | - | - | - | - |
| Q4 | - | - | - | - |
| Q5 | 1,000 | 1,800 | 2,900 | 900 |
| Q6 | 250 | 280 | 220 | 250 |
| Q7 | - | - | - | - |
| Q8 | 2,000 | 1,800 | 2,100 | 1,900 |
| Q9 | 100 | 100 | 1,437 | 100 |
| Q10 | 200 | 200 | 200 | 200 |

| City C 302c | Time Period 1 | Time Period 2 | Time Period 3 | Time Period 4 |
|---|---|---|---|---|
| Query | Excess Query Count | Excess Query Count | Excess Query Count | Excess Query Count |
| Q1 | 9,000 | 9,000 | 9,000 | 9,000 |
| Q2 | - | - | - | - |
| Q3 | 7,000 | 6,000 | 8,000 | 7,000 |
| Q4 | - | - | - | - |
| Q5 | - | - | - | - |
| Q6 | 12,000 | 14,000 | 8,000 | 11,000 |
| Q7 | - | - | - | - |
| Q8 | 3,000 | 3,000 | 3,000 | 3,000 |
| Q9 | - | - | - | - |
| Q10 | - | - | - | - |

Conclusion: City B is a similar geographic feature to City A — 306

FIG. 3

FINDING SIMILAR CITIES USING GEO-RELATED QUERIES

RELATED APPLICATION

This application is a continuation-in-part of U.S. patent application Ser. No. 12/965,752, filed on Dec. 10, 2010, entitled "FINDING SIMILAR CITIES USING GEO-RELATED QUERIES," the contents of which are hereby incorporated by reference.

BACKGROUND

This specification relates to information presentation.

The Internet provides access to a wide variety of resources such as video and audio files, web pages for particular subjects, book articles, and news articles. A search system can identify resources in response to a text query that includes one or more search terms or phrases. The search system can rank the resources based on their relevance to the query and on measures of quality of the resources and can provide search results that link to the identified resources. The search results are typically ordered for viewing according to the rank.

Some search systems can, if location is known, include local search results that are responsive to the search query. In some systems, local search results are search results that have been classified as having local significance to the particular location of the user device. For example, in response to a search query for "coffee shop," the search system may provide local search results that reference web pages for coffee shops near the location of the user device.

Some search queries may include location information as part of the query. For example, a search query may include a specific location, landmark, geographic feature, region or other location designator.

Still other queries may include terms that are more relevant to one or more geographic locations or regions. For example, some users in some parts of the United States may submit the search query "rock quarry" more often than users in other areas. There may be one or more geographic regions where a rock quarry is a local tourist attraction, for example.

SUMMARY

This specification describes technologies relating to information presentation.

In general, one innovative aspect of the subject matter described in this specification can be implemented in methods that include a method that comprises: determining excess queries over multiple time periods for two or more given geographic features, where each geographic feature defines a location; comparing the two or more geographic features for similarity based at least in part on the determined excess queries associated with each geographic feature; for a given target geographic feature, determining one or more similar geographic features based on the comparing; and relating electronically the target geographic feature and the one or more similar geographic features as a set of similar geographic features. Determining the excess queries over the multiple time periods for the two or more given geographic features can include: generating a geo-query count that represents a total number of times that the search query was received over a specified period; obtaining a corresponding expected query count for the at least one of the search queries by accessing a search query log that includes data specifying search queries corresponding to a particular geographic feature; comparing the geo-query count to the corresponding expected query count for the at least one of the search queries, the corresponding expected query count being a baseline number of times that the query is expected to be received; and in response to determining that the geo-query count of the at least one of the search queries exceeds the corresponding expected query count by at least a threshold amount, classifying the at least one of the search queries as an excess query for the particular geographic feature.

These and other implementations can each optionally include one or more of the following features. Each geographic feature can be a city. The corresponding expected query count for the at least one of the search queries can be obtained by accessing a search query log that includes data specifying search queries corresponding to a particular geographic feature. The multiple time periods can be separated in time by one or more intervals. Comparing geographic features for similarity can include determining a number of excess queries in common between two geographic features. Comparing geographic features for similarity can include determining a similarity threshold equal to a minimum number of excess queries that must be shared between two geographic features in order to find similarity. Determining one or more similar geographic features can be based on the comparing includes determining one or more geographic features that share a number of excess queries that is greater than the similarity threshold for the target geographic feature. Comparing geographic features for similarity can include determining a quality of the excess queries shared by the target geographic feature and a candidate geographic feature. The quality can be measured based at least in part on a volume of queries associated with the excess queries. The quality can be measured using semantic clustering of terms by meaning. Determining one or more similar geographic features can include comparing a number of shared excess queries and a number of dissimilar excess queries for the target geographic feature and a candidate geographic feature. Comparing a number of dissimilar excess queries can include determining if the number of dissimilar excess queries exceeds a dissimilarity threshold, and determining that the target geographic feature and candidate geographic feature are not similar if the number of dissimilar excess queries exceeds the dissimilarity threshold. The method can further comprise: attributing information associated with one geographic feature with a similar geographic feature; and using the attributed information to target content to the similar geographic feature. The information can be targeting information. The information can be a label associated with the one geographic feature. The multiple time periods evaluated can be the same for each geographic feature. Determining excess queries over multiple time periods for a given geographic feature can further include: for each time period, determining a query volume for every query in every geographic feature; for every query, calculating a volume of each query across all geographic features; for every geographic feature, calculating a query volume across all queries; calculating a total volume of queries; and calculating an excess for each query in each geographic feature. The method can further comprise creating a two dimensional array based on the excess queries per geographic feature. The method can further comprise using the two dimensional array to determine similar geographic features.

Another innovative aspect of the subject matter described in this specification can be implemented in non-transitory machine-readable media comprising instructions stored therein, which when executed by a processor, causes the processor to perform operations comprising: determining excess queries over multiple time periods for two or more given geographic features, where each geographic feature defines a location; comparing the two or more geographic features for similarity based at least in part on the determined excess queries associated with each geographic feature; for a given target geographic feature, determining one or more similar geographic features based on the comparing; and relating electronically the target geographic feature and the one or more similar geographic features as a set of similar geographic features. Determining the excess queries over the multiple time periods for the two or more given geographic features can include: generating a geo-query count that represents a total number of times that the search query was received over a specified period; obtaining a corresponding expected query count for the at least one of the search queries by accessing a search query log that includes data specifying search queries corresponding to a particular geographic feature; comparing the geo-query count to the corresponding expected query count for the at least one of the search queries, the corresponding expected query count being a baseline number of times that the query is expected to be received; and in response to determining that the geo-query count of the at least one of the search queries exceeds the corresponding expected query count by at least a threshold amount, classifying the at least one of the search queries as an excess query for the particular geographic feature.

These and other implementations can each optionally include one or more of the following features. The instructions for comparing the two or more geographic features for similarity can include instructions for determining a number of excess queries in common between two geographic features. The instructions for comparing the two or more geographic features for similarity can include instructions for determining a similarity threshold equal to a minimum number of excess queries that must be shared between two geographic features in order to find similarity, and where the instructions for determining one or more similar geographic features based on the comparing includes instructions for determining one or more geographic features that share a number of excess queries that is greater than the similarity threshold for the target geographic feature.

Another innovative aspect of the subject matter described in this specification can be implemented in systems comprising: one or more processors and a non-transitory machine-readable medium comprising instructions stored therein, which when executed by the processors, cause the processors to perform operations. The operations can include: determining excess queries over multiple time periods for two or more given geographic features, where each geographic feature defines a location; comparing the two or more geographic features for similarity based at least in part on the determined excess queries associated with each geographic feature; for a given target geographic feature, determining one or more similar geographic features based on the comparing; and relating electronically the target geographic feature and the one or more similar geographic features as a set of similar geographic features. Determining the excess queries over the multiple time periods for the two or more given geographic features can include: generating a geo-query count that represents a total number of times that the search query was received over a specified period; obtaining a corresponding expected query count for the at least one of the search queries by accessing a search query log that includes data specifying search queries corresponding to a particular geographic feature; comparing the geo-query count to the corresponding expected query count for the at least one of the search queries, the corresponding expected query count being a baseline number of times that the query is expected to be received; and in response to determining that the geo-query count of the at least one of the search queries exceeds the corresponding expected query count by at least a threshold amount, classifying the at least one of the search queries as an excess query for the particular geographic feature.

These and other implementations can each optionally include one or more of the following features. The operations for comparing the two or more geographic features for similarity can include determining a number of excess queries in common between two geographic features. The operations for comparing the two or more geographic features for similarity can include determining a similarity threshold equal to a minimum number of excess queries that must be shared between two geographic features in order to find similarity, and where the instructions for determining one or more similar geographic features based on the comparing includes instructions for determining one or more geographic features that share a number of excess queries that is greater than the similarity threshold for the target geographic feature.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 3 is a block diagram illustrating excess query counts for different geographic features over multiple time periods.

Like reference numbers and designations in the various drawings indicate like elements.

DETAILED DESCRIPTION

Figure 1:
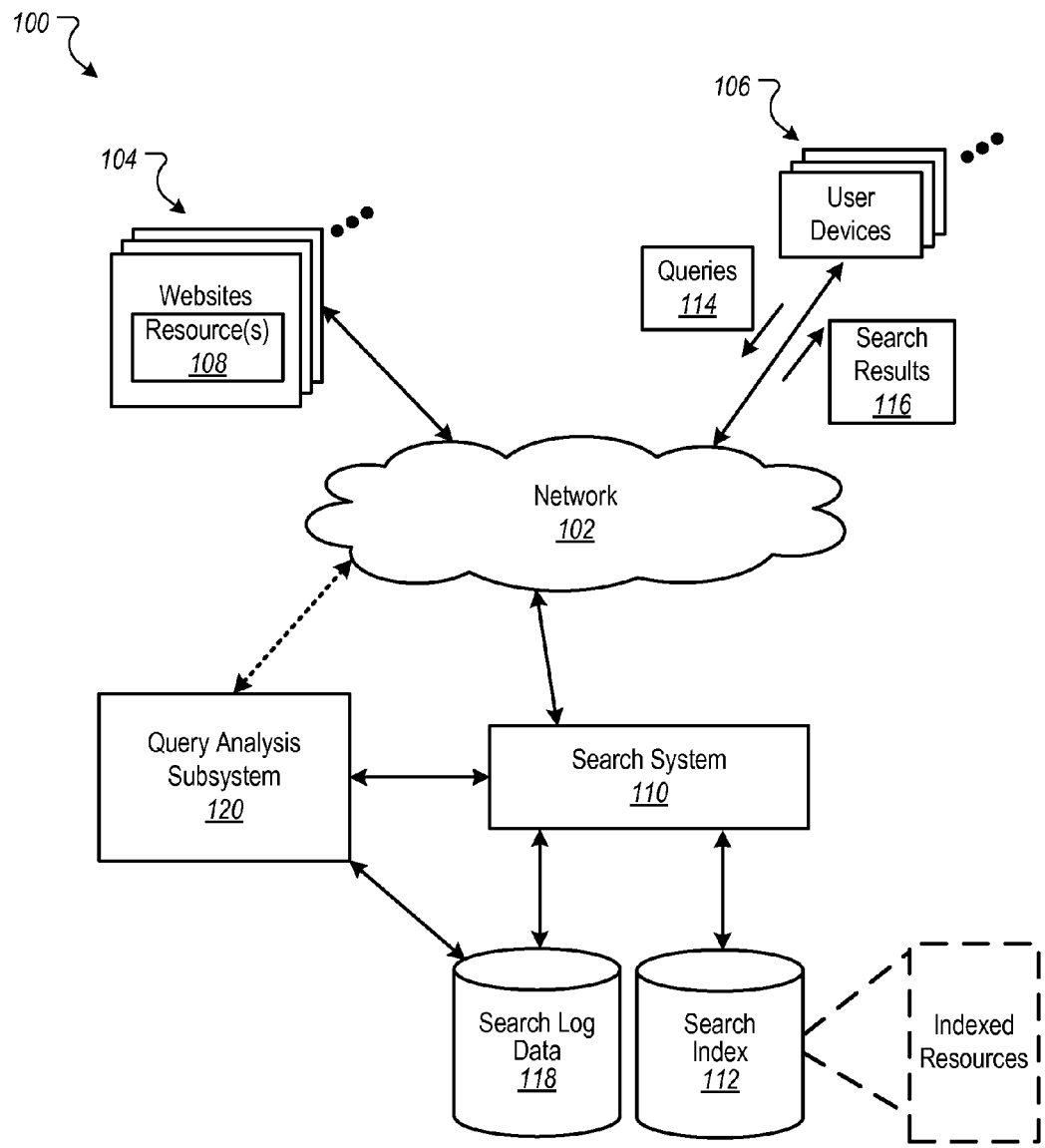
FIG. 1 is a block diagram of an example environment for determining similar geographic features.

A search query can be identified as a geographically local ("local") search query for a particular geographic feature (e.g., a geographic region, such as a city) based on a number of times that the search query is received from users located in the particular geographic region. This quantification is referred to as a geo-query count for the particular geographic region. For example, the geo-query count for a particular geographic region can be compared to a corresponding expected query count for that geographic region to determine whether the geo-query count exceeds the corresponding expected query count. If the geo-query count exceeds the expected query count by a pre-determined threshold, for example, then the search query can be classified as a local search query for the particular geographic region. In some implementations, this same type of processing can be done without thresholding, such as using a continuous measure of excess (e.g., as a percent increase above the expected query count).

The expected query count is a baseline number of queries that are expected to be received, over a specified period of time, from user devices in the particular geographic region. The expected query count can be computed, for example, based on a query share for the query and a total number of queries that have been received from user devices in the particular geographic region. In various embodiments herein, in order to obtain the benefits of such information, the users of the devices may have to select participation and/or install an application to make such information from the user devices available. The query share represents a portion of the total queries that are expected to match the search query. For example, the query share can be computed as a ratio of the number of times that the search query was received from user devices in a baseline, or reference, geographic region (e.g., the United States of America) relative to the total number of queries that have been received from user devices in the baseline geographic region. The query share for the query can be multiplied by the total number of queries received from user devices in the particular geographic region to compute the expected query count for the query.

When determining whether a query is a local query, the amount by which the geo-query count exceeds the expected query count is an excess query count. For example, the excess query count can correspond to a particular query for a given geographic feature over a specific time period. Excess query counts can also be determined for other geographic features and other time periods, and the information can be stored. By comparing excess query counts for different geographic features over multiple time periods, similarities among different geographic features can be determined. As a result, for any given geographic feature, one or more other similar geographic features can be determined. For example, for San Francisco, one or more other cities in the US can be determined to be similar cities based on similarities among the excess query counts for San Francisco and the other cities.

In some implementations, the excess queries of multiple geographic features can be analyzed to determine similar geographic features. For example, the analysis can compare the excess queries that two or more cities share. If the cities share a significant number or amount of excess queries, for example, the cities can be designated as similar geographic features. In some implementations, advertisers and publishers can use the information for similar geographic features, for example, to target and serve content. The targeted content can include ads that can be served to cities that are similar to a city where the content (or ad) is already known to be popular (e.g., based on the number of clicks, etc.). In this way, the advertisers and publishers can target content to users who may be most likely interested in the content.

FIG. 1 is a block diagram of an example environment 100 for determining similar geographic features. The environment 100 includes a search system 110 that provides search services and a query analysis subsystem 120 that analyzes queries, such as to determine similar geographic features based on the queries. The environment 100 includes a network 102, e.g., a local area network (LAN), wide area network (WAN), the Internet, or a combination of them, that connects publishers 104, user devices 106, the search system 110, and the query analysis subsystem 120. The environment 100 may include many thousands of publishers and user devices 106.

A web site 104 can include one or more resources 108 associated with a domain name and hosted by one or more servers. An example web site is a collection of web pages formatted in hypertext markup language (HTML) that can contain text, images, multimedia content, and programming elements, e.g., scripts. Each web site 104 can be maintained by a publisher, e.g., an entity that manages and/or owns the web property.

A resource 108 is any data that can be provided by the web site 104 over the network 102 and that is associated with a resource address. Resources 108 include HTML pages, word processing documents, portable document format (PDF) documents, images, video, and feed sources, to name a few examples. The resources 108 can include content, e.g., words, phrases, images and sounds, and may include embedded information (e.g., meta information and hyperlinks) and/or embedded instructions (e.g., JavaScript scripts).

A user device 106 is an electronic device that is under control of a user and is capable of requesting and receiving resources over the network 102. Example user devices 106 include personal computers, mobile communication devices (e.g., smartphones), and other devices that can send and receive data over the network 102. A user device 106 typically includes a user application, e.g., a web browser, to facilitate the sending and receiving of data over the network 102.

To facilitate searching of resources 108, the search system 110 can identify the resources 108 by crawling and indexing the resources 108 provided by the publishers 104. Data about the resources 108 can be indexed based on the resource 108 to which the data corresponds. The indexed and, optionally, cached copies of the resources 108 are stored in a search index 112.

The user devices 106 submit search queries 114 to the search system 110. In response, the search system 110 accesses the search index 112 to identify resources 108 that are predicted to be relevant to the search query 114, for example based on relevance scores that have been computed for the resources 108. The search system 110 selects resources 108, generates search results 116 that identify the resources 108, and returns the search results 116 to the user devices 106. A search result 116 is data generated by the search system 110 that references a resource 108 that is responsive to a particular search query, and includes an active link (e.g., a URL) to the resource. An example search result 116 can include a web page title, a snippet of text or a portion of an image extracted from the web page, and the URL of the web page.

User devices 106 receive the search results 116 and render the search results 116, for example, in the form of one or more web pages, for presentation to users. In response to the user selecting a link (e.g., URL) in a search result at a user device 106, the user device 106 requests the resource 108 referenced by the link. The web site 104 hosting the resource 108 receives the request for the resource 108 from the user device 106 and provides the resource 108 to the requesting user device 106.

Search results 116 are selected to be provided to a user device 106 in response to a search query 114 based on initial result scores. Result scores are scores that represent a measure of relevance (e.g., a predicted relevance) of the resource 108 to a search query. For example, a result score for a resource 108 can be computed based on an information retrieval ("IR") score corresponding to the resource 108 and, optionally, a quality score of the resource 108 relative to other available resources. A presentation order for the search results 116 can be selected based on the result scores. In turn, data that causes presentation of the search results 116 according to the presentation order can be provided to the user device 106.

In some implementations, the relevance of a particular resource to a particular search query can be determined, in part, through statistical analysis of search log data 118.

Search log data is data that specifies search queries received from all users or groups of users and subsequent selections (i.e., clicks) by those users of particular search results. For example, information in the search log data store 118 may specify that the search query "football" was received from 1,000,000 users, and that 100,000 of these users subsequently selected a search result referencing a web page for a professional football league, while 150,000 of these users selected a web page for a college football league.

The query analysis subsystem 120 can perform statistical analyses of queries for different geographic features (e.g., different cities) to determine similarities among the different geographic features. For example, information from the search log data store 118 can be used to identify cities that have statistically similar excess queries. In some implementations, information associated with one geographic feature can be attributed to a similar geographic feature, and the attributed information can be used to target content to the similar geographic feature. For example, ads or other content that appear in one city can be targeted to another similar city. In some implementations, the query analysis subsystem 120 can be implemented as an element of the search system 110. In some implementations, the query analysis subsystem 120 can be implemented in a data processing apparatus that communicates over the network 102 with the search system 110.

In some implementations, the attributed information can be a label or other form of characterization that is associated with one geographic feature (and then attributed to a similar geographic feature as described in further detail below). The label can be of the form of a push-pin on a map that corresponds to (and is labeled with) the geographic feature. In some implementations, the determination of similarities among the different geographic features can be based on analyzing queries for multiple time periods, where the multiple time periods evaluated are the same for each geographic feature. For example, using the multiple time periods, trends can be determined for a particular geographic feature (e.g., queries for a product in a West Coast high-tech city). The trends can be used, for example, to associate ads or other content to similar geographic features. For example, an East Coast city can be similar to a West Coast city if, for example, users in both cities submit large number of queries for the same subject (e.g., nuclear physics). In this this example, the two cities may be similar because, over time, they have had similar patterns of excess queries, e.g., related to nuclear physics. In some implementations, similarity can be measured over different time periods. That is, similarity between features may be determined including identifying a time lag for a trend to progress from one geographic feature to another similar geographic feature that is merely offset in time.

Figure 2A:
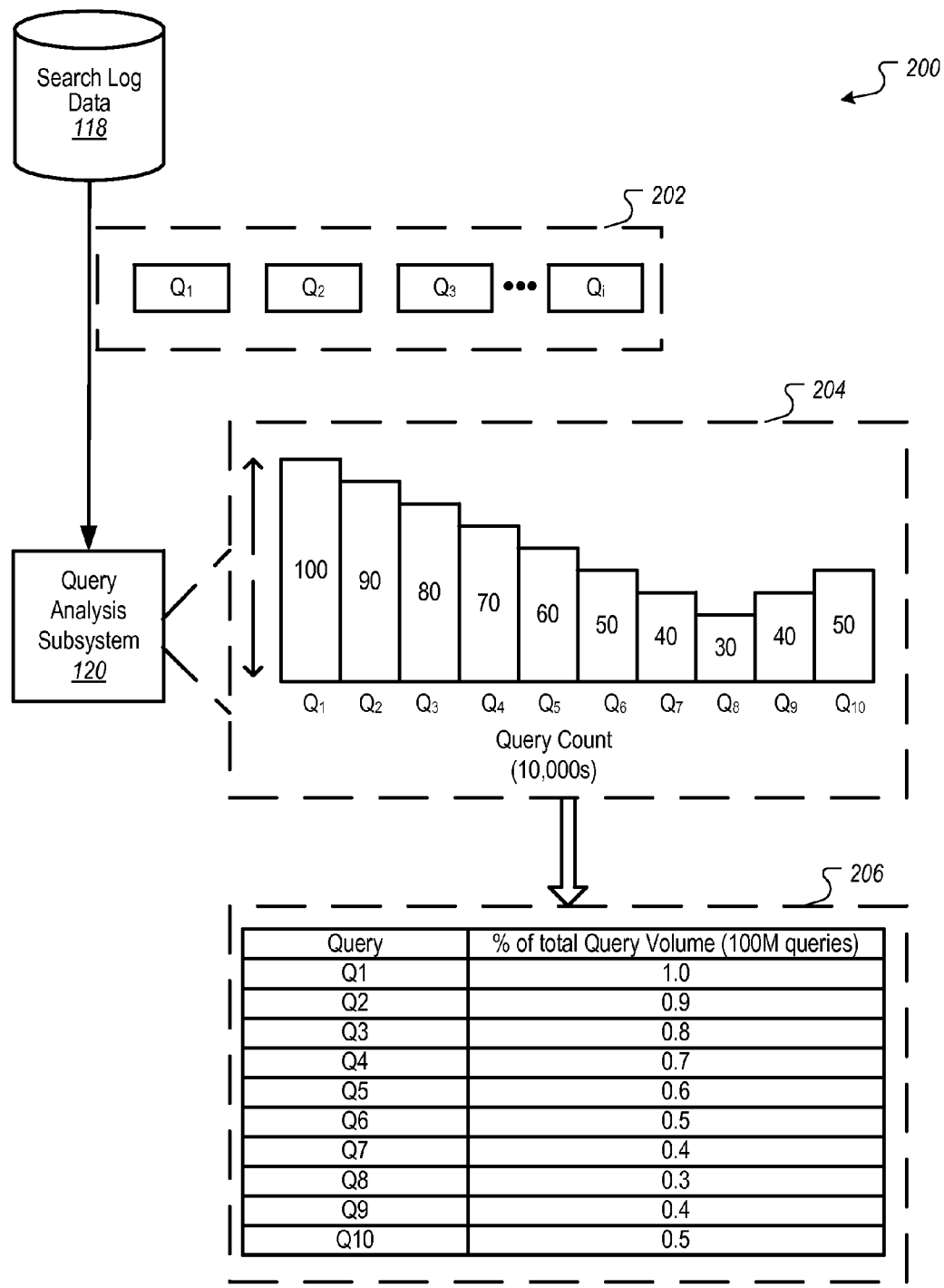
FIGS. 2A and 2B are block diagrams illustrating data flows corresponding to classification of search queries as excess queries.
Figure 2B:
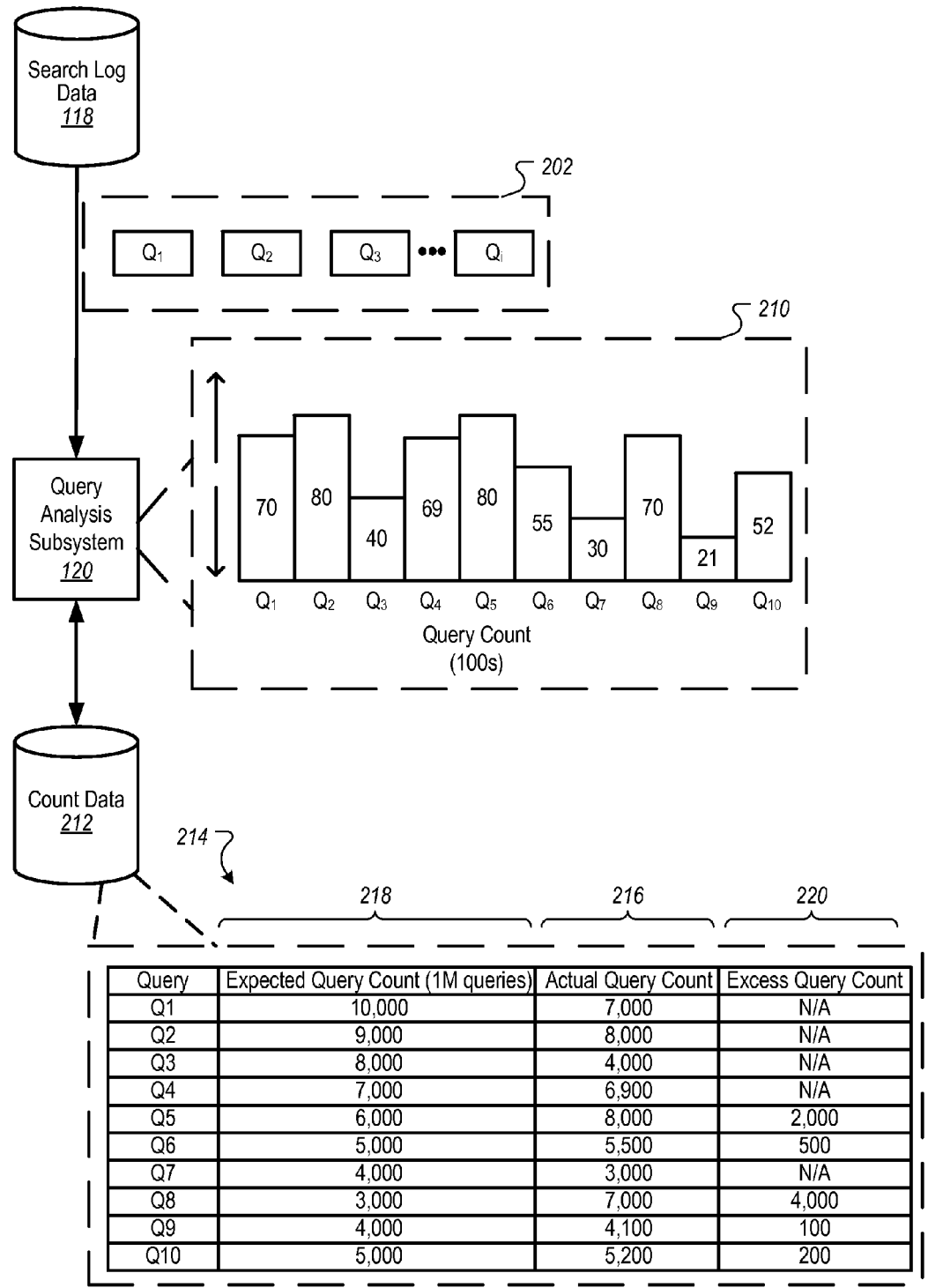

FIGS. 2A and 2B are block diagrams illustrating data flows corresponding to the identification of excess queries. The query analysis subsystem 120 receives search log data 202 from the search log data store 118. The search log data 202 includes queries ($Q_1$-$Q_j$) that were received from groups of users, and data specifying the locations from which the queries were received. In some implementations, the search log data 202 can include all queries that were received from users in a baseline (or reference) geographic region. For example, the search log data 202 can include search queries that were received from all users within the continental United States. In some implementations, the search log data 202 can include only queries that were received from users at least a threshold or minimum number of times. For example, the queries included in the search log data 202 can include queries that were received at least a statistically relevant number of times (e.g., relative to a total number of queries received).

In some implementations, the search log data 202 received by the query analysis subsystem 120 is a set of search queries that were received from groups of users over a specified period. The specified period can be, for example, a specified amount of time or a specified number of events. For example, the search log data 202 can include or specify search queries that were received from the groups of users over a previous calendar month (or year) or the past 100,000,000 search queries that have been received.

The query analysis subsystem 120 can analyze the search log data 202 to obtain a query landscape 204 for the search log data 202. A query landscape is a collection of queries and a corresponding number of times that each of the search queries was received from user devices. In some implementations, the query landscape 204 can be obtained using a subset of the search log data 202. For example, the query landscape 204 can be obtained by selecting a threshold number queries that were received more often than the remaining queries. For illustrative purposes only, 10 queries ($Q_1$ through $Q_{10}$) are selected and included in FIG. 2A; however, thousands or even millions of queries can be selected for the query landscape 204. Alternatively, the query landscape 204 can also include each query that was included in the search log data 202.

In the example shown, the query landscape 204 includes a reference to each of the ten queries and a corresponding number of times that each query was received from user devices over the specified period. For example, according to the query landscape 204, the query Q1 was received 1,000,000 times over the specified period, while the query Q7 was received 400,000 times over the specified period.

Using the query landscape 204, the query analysis subsystem 120 can determine a set of query shares 206, including a query share for each of the queries ($Q_1$-$Q_{10}$) in the query landscape 204. A query share for a query is a measure of the query count for the query relative to the total number of queries that were received. For example, the total number of queries that are counted in the query shares can be each of the queries specified by the search log data as being received over a specified period. In some implementations, the query share for each of the queries ($Q_1$-$Q_{10}$) can be computed as a ratio of the query count relative to the total number of queries (i.e., Query Share=Query Count/Total Queries received over specified period). For example, the query share for the query $Q_1$ has been computed to be 1.0% (i.e., 1,000,000/100,000,000), and the query share for the query $Q_7$ has been computed to be 0.4% (i.e., 400,000/100,000,000). To give the query shares a concrete context, for example, the query $Q_1$ (e.g., for "football") can have a nationwide occurrence percentage of 1.0% relative to all nationwide queries (e.g., including queries for "football"). Similarly, the query $Q_7$ (e.g., for "pie") can have a nationwide percentage of 0.4% relative to all nationwide queries. The percentages are relative to queries that occur during the given time period.

Referring now to FIG. 2B, the query analysis subsystem 120 can also analyze the search query log 202 to identify search queries that were received from user devices located in a particular geographic region. As described above, each query can have a corresponding geographic identifier that specifies a location of the user device that submitted the query. The query analysis subsystem 120 can use these geographic identifiers to filter the search query data 202 to select only queries that were received from user devices in a particular geographic region. In various embodiments herein, in order to obtain the benefits of such embodiments, the user may have to select participation and/or install an application such that location and/or other information are available.

Using the geographic identifiers, the query analysis subsystem 120 can determine a total number of queries that have been received from user devices in the particular geographic region. For example, the query analysis subsystem 120 can compute a sum of all queries received from user devices located in the particular geographic region over the specified period. The query analysis subsystem 120 can also determine, for each search query received over the specified period, a geo-query count. A geo-query count is a value that represents a total number of times that one or more queries were received from user devices in the particular geographic region. The query analysis subsystem 120 can compute, for the specified period, a total geo-query count that represents a total number of search queries that were received from user devices in the particular geographic region.

The geo-query counts for the queries can be used to obtain a geo-query landscape 210 that is a collection of queries received for a particular geographic region and corresponding numbers of times that the queries were each received from user devices in the particular geographic region over a given time period. For example, the geo-query landscape 210 specifies that the query $Q_1$ was received 7,000 times and that the query $Q_8$ was received 8,000 times, such as over the same 24-hour period. The geo-query landscape 210 can be stored, for example, in a count data store 212. The geo-query counts obtained from the geo-query landscape 210 can be indexed, for example, based on the query to which they correspond. For example, the query $Q_1$ can be used to index information in the geo-query landscape 210 for the current geographic region or for similar data in the geo-query landscape 210 for other geographic regions. As an example, the index for the query $Q_1$ can be used to look up geo-query landscape 210 information for multiple geographic regions, such as to compare geo-query counts for individual queries (e.g., ($Q_1$-$Q_{10}$)) across multiple geographic regions.

A table 214 lists the geo-query counts for the queries ($Q_1$-$Q_{10}$) in an actual query count column 216 titled "Actual Query Count." The values in the actual query count column 216 correspond to the geo-query count values in the geo-query landscape 210 for the current geographic region over the current time period. The actual query count values can be used for comparison with expected query counts for the same queries.

The query analysis subsystem 120 can use the total geo-query count for a particular geographic region to obtain an expected query count for each of the queries. In some implementations, the query analysis subsystem 120 can obtain the expected query count for each query by multiplying the total geo-query count by the query share that was computed for the query (i.e., (expected query count)=(total geo-query count)* (query share)). For example, if the total geo-query count is 1,000,000, then the expected query count for the query $Q_1$ is computed to be 10,000 (i.e., 10,000=1,000,000*0.01). Similarly, the expected query count for the query $Q_8$ is computed to be 7,000 (i.e., 7,000=1,000,000*0.007). To give the expected query count a concrete context, the queries $Q_1$ and $Q_8$ are expected to occur 10,000 and 7,000 times, respectively, within the given time period for the geographic feature. The expected query counts for the queries can be stored, for example, in the count data store 212 and indexed based on the query to which each of the expected query counts correspond. For example, the table 214 lists the expected query counts for the queries ($Q_1$-$Q_{10}$) in an expected query count column 218 titled "Expected Query Count."

The query analysis subsystem 120 compares the geo-query counts for each of the queries to the corresponding expected query count for each query to determine whether the geo-query count for the query exceeds the expected query count. Referring to FIG. 2B, for example, the query analysis subsystem 120 can compare values in the actual query count column 216 to values in the expected query count column 218 to determine values in an excess query count column 220. For example, comparing the geo-query counts to the expected query counts reveals that the geo-query counts for the queries $Q_1$-$Q_4$ and $Q_7$ fail to exceed the corresponding expected query counts for these queries, thus resulting in "N/A" entries in the excess query count column 220 for those queries. However, the comparisons also reveal that the geo-query counts for the queries $Q_5$, $Q_6$, and $Q_8$-$Q_{10}$ do exceed the corresponding expected query counts for these queries. Namely, the queries $Q_5$, $Q_6$, and $Q_8$-$Q_{10}$ from the particular geographic region were submitted in excess of what is expected. As a result, the entries in the excess query count column 220 for those queries are positive values. The values represent the difference between actual and expected query counts, from columns 216 and 218, respectively. Specifically, the excess query count for the query $Q_5$ is 2000 (e.g., 8000-6000), and so on. Thus, these queries may be locally significant queries for the particular geographic region, and may qualify to be classified as local queries.

In some implementations, the query analysis subsystem 120 can classify, as a local query, any query having a geo-query count that exceeds the corresponding expected query count. In some implementations, the query analysis subsystem 120 can require that a local query be a query for which the geo-query count exceeds the corresponding expected query count by at least a threshold amount.

For example, the query analysis subsystem 120 can require that the geo-query count exceed the expected query count by a specified percentage (e.g., 20%) or by an absolute number (e.g., 1,000). The query analysis subsystem 120 can also require that each query that is classified as a local query be one of N queries (e.g., 10, 100 or 1,000 queries) having geo-query counts that exceed the corresponding expected query counts by the highest amount. Assuming that the query analysis subsystem 120 requires local queries to have a geo-query count that exceeds the expected query count by at least 40%, the queries $Q_5$ and $Q_8$ would qualify to be classified as local queries for the particular geographic region.

As described above, search queries can be received from a number of different user devices (e.g., desktop personal computers or mobile devices). However, users that submit queries from a mobile device are generally more likely to be searching for local search results than users that submit queries from a desktop computing device. Therefore, the query landscapes for queries submitted using mobile devices can be substantially different than the query landscapes for queries submitted using other devices.

In some implementations, a query landscape can be generated using search queries that were received from mobile user devices (e.g., cell phones), and a separate query landscape can be generated using search queries that were received from other user devices (e.g., personal computers). In other words, the query landscapes can be partitioned according to the different types of devices that were used to submit the queries. In some implementations, separate query shares (e.g., a mobile device query share and a query share for other non-mobile devices) can be generated using the separate query landscapes. In turn, separate expected query counts (e.g., a mobile expected query count and an expected query count for other, non-mobile devices) can be computed using the separate query shares and the total geo-query count for the particular geographic region. Once the separate expected query counts have been computed, a particular search query can be classified as a local and/or non-local query using the separate expected query counts.

For example, if the particular search query has been received from non-mobile user devices located in the particular geographic region, and the particular search query has an actual query count that is more than the expected non-mobile query count, then the particular search query can be classified as a local query for non-mobile devices. However, if the particular search query has been received from mobile user devices located in the particular geographic region, and the particular search query has an actual query count that is less than the expected mobile query count, then the particular search query will not be classified as a local query for mobile devices.

The query analysis subsystem 120 can use the non-zero entries in the excess query count column 220 in comparisons with similar data for other geographic features (e.g., other cities) to determine similar geographic features. For example, similar excess query count data can exist for other cities for the same queries (e.g., $Q_5$, $Q_6$, and $Q_8$-$Q_{10}$). Further, other cities, for example, may have excess queries for other queries in the set of queries $Q_1$-$Q_{10}$, namely any of the queries $Q_1$-$Q_4$ and $Q_7$ which had no excess queries in the current example. Moreover, multiple time periods can be used, for example, for comparing excess query counts for multiple geographic features over multiple time periods. By comparing the queries for different geographic features (e.g., cities) in this way, the query analysis subsystem 120 can, for example, identify similar geographic features, each of which having potentially related sets of excess queries over time. Doing so can result in a determination that one or more similar geographic features exist for a given geographic feature. As an example, the query analysis subsystem 120 can determine that, for a city such as San Francisco, other cities such as Fresno are similar, where the similarity exists because users in both cities generate similar local or geographically-based queries, as determined from excess query counts over time.

FIG. 3 is a block diagram illustrating excess query counts for different geographic features over multiple time periods. For example, the query analysis subsystem 120 can determine the excess query counts as described above with reference to FIGS. 2A and 2B. In the example shown in FIG. 3, the excess query counts are divided into three separate data tables 302a, 302b and 302c that correspond to Cities A, B and C, respectively. Each of the data tables 302a, 302b, 302c includes columns of excess query counts that correspond to multiple time periods 304a-304d. The values listed for City A's excess query counts in the first time period 304a, for example, correspond to the values in the excess query count column 220 from the table 214 (see FIG. 2B). The process described above in reference to FIGS. 2A and 2B can be repeated for the other three time periods 304b-304d for City A's data table 302a. The process can also be used for all four time periods 304a-304d to determine the excess query counts for City B's data table 302b and City C's data table 302c. The three cities, four time periods and ten queries used in FIG. 3 represent just a small sample of a universe of excess query counts. For example, many thousands of cities (or other geographic features) can be used, as well as many hundreds or thousands of time periods, and potentially millions of queries.

In some implementations, the query analysis subsystem 120 can store the excess query counts for each geographic feature (e.g., each city) in two-dimensional arrays. For example, referring to FIG. 3, the data tables 302a, 302b, 302c show storage of the excess query counts the Cities A, B and C as arrays with a query dimension (e.g., the queries $Q_1$-$Q_{10}$) and a time dimension (e.g., the time periods 304a-304d).

Other dimensions and storage methods can be used for the storage of the excess query counts, such as using three dimensions, where the dimensions are queries, time periods, and geographic features, and indexes can exist for any or all of the dimensions.

In some implementations, the multiple time periods used for counting and analyzing excess queries, such as the time periods 304a-304d, can be separated in time by one or more intervals. For example, the time period 304a can be an hour-long time period that is separated by several hours, days, weeks or months from any other time periods, including the time periods 304b-304d. In some implementations, the query analysis subsystem 120, for example, can select time periods that provide a sufficiently representative number of queries for analysis. For example, for the query Yosemite, time periods can be selected that contain hundreds or thousands or more queries, as opposed to shorter time periods that include only a few queries, which may not lead to useful analyses of the excess query counts. Similar cities can be determined from the excess query counts shown in FIG. 3, e.g., for the Cities A and B having excess query counts listed in data tables 302a and 302b, respectively. Specifically, a similarity exists between the two Cities A and B for the queries $Q_5$ and $Q_8$ for all four time periods. For example, the City A data table 302a includes, for the query $Q_5$, excess query counts of 2000, 4000, 6000 and 2000 over the four time periods. Similarly, the City B data table 302b includes, for the same query $Q_5$, excess query counts of 1000, 1800, 2900 and 900. While City B's numbers are not equal to the numbers for City A, they have been determined by the query analysis subsystem 120 to represent similar excess queries.

Some implementations can compute and store excess query count values (e.g., in the data table 302a-302c) as relative values, e.g., percentages of expected counts. As a result, while City B's excess query count values are lower in an absolute sense, they may in fact represent relatively the same or a larger percentage relative to the expected counts. For example, each the query $Q_5$ excess query counts for Cities A and B, when treated as a percentage of expected counts, may be 20% or greater, indicating that Cities A and B are similar cities, at least when taking the query $Q_5$ into account.

However, two cities that have only one commonality, e.g., based on the query $Q_5$ excess query counts for a given time period, may not necessarily lead to a determination that the cities are similar. Other similarities in the excess query counts may also need to exist. For example, referring to the data tables 302a and 302b in FIG. 3, similar excess query counts for Cities A and B can also be determined to exist also for the query $Q_8$ over all four time periods. The commonality for the query $Q_8$ and other queries over several time periods can be sufficient for the query analysis subsystem 120 to make a conclusion 306 that City B is a similar geographic feature to City A. For example, the conclusion can be based at least in part on the values in the data tables 302a and 302b that are bolded for the queries $Q_5$ and $Q_8$ over all four time periods.

In some implementations, comparing geographic features for similarity can include determining a similarity threshold equal to a minimum number of excess queries that must be shared between two geographic features in order to find similarity. For example, in order for the query analysis subsystem 120 to determine that San Francisco and Boston are geographically similar, a pre-determined minimum number of excess queries (e.g., five, ten, 100, etc.) must be shared, not just two (e.g., the queries $Q_5$ and $Q_8$). Specifically, San Francisco and Boston, to be considered similar geographic features, must share a number of excess queries that is greater than the similarity threshold (e.g., five, ten, 100, etc.). In some implementations, similarity can also be determined using a weighted measure of the shared excess scores. For example, if San Francisco had 300 excess terms with excess percentages ranging from 1% to 20%, and Boston had 200 excess terms with excess percentages in the same range, then the determination of whether or not San Francisco and Boston are similar can be based on the pure overlap in these excess lists, as described above (e.g., 100 shared excess queries). In some implementations similarity can be based on an average percentage of shared excess queries (e.g., (100/200+100/300)/2=41.7% shared excess). In some implementations similarity can be based on a weighted percentage. For example, if all the shared excess queries were at 20% excess for both locations, and if all non-overlapping excess queries were at 1% excess in both locations, then the weighted excess measure would be (100*0.2/(100*0.2+100*0.01)+100/(100*0.2+200*0.01))/2=93%.

In some implementations, the query analysis subsystem 120 can also consider dissimilar, or mismatched, excess queries when determining whether a candidate geographic feature (e.g., Jackson, Miss.) is a similar geographic feature to the target geographic feature (e.g., San Francisco). A dissimilar excess query can be, for example, a significantly large excess query for the target geographic feature and a zero or insignificant excess query for the candidate geographic feature. For example, referring to FIG. 3, City C's data table 302c (e.g., which can represent Jackson, Miss.) includes excess query counts in the thousands for the queries $Q_1$, $Q_3$ and $Q_6$. These values are dissimilar to the values in City A's data table 302a (e.g., San Francisco), which has zero or null values for queries $Q_1$ and $Q_3$, and values in the low hundreds for the query $Q_6$. The query analysis subsystem 120, for example, can use these dissimilarities to determine that City A (e.g., San Francisco) is dissimilar to City C (e.g., Jackson, Miss.). This determination can be made by considering the dissimilarities for the queries $Q_1$, $Q_3$ and $Q_6$, in combination, in spite of a single shared set of excess query counts for the query $Q_8$.

In some implementations, when dissimilar excess queries are used in determining whether geographic features are similar, one or more dissimilarity thresholds can be used. For example, one type of dissimilarity threshold can specify that a certain number of dissimilar excess query counts (e.g., ten or more) can result in determining that the geographic features are not similar, regardless of excess query counts. In another example, a different type of dissimilarity threshold can specify that a certain percentage of dissimilar excess query counts (e.g., 50% or more) relative to similar excess query counts can result in determining that the geographic features are not similar. For example, even if N similar excess query counts are shared between geographic features, if N/2 dissimilar excess query counts also exist, then the query analysis subsystem 120 can determine that the geographic features are not similar. In either example, if the dissimilarity thresholds are not met, then the geographic features can be determined to be similar.

Some implementations can consider the quality of the excess queries shared by a target geographic feature and a candidate geographic feature. For example, a higher quality of the excess queries shared between two or more geographic features can increase the likelihood that the geographic features will be determined to be similar. In some implementations, one measure of quality can be the query volume associated with excess queries. Example volume measurements can include an absolute number (e.g., the difference between a geo-query count and the corresponding expected query count) and a relative number (e.g., the percentage by which a geo-query count exceeds the corresponding expected query count). For example, a particular excess query in which the geo-query count exceeds its corresponding expected query count, e.g., by 300%, can be said to have a higher quality than a second excess query in which the geo-query count exceeds its corresponding expected query count by just 20%. In some implementations, other measures of quality can be used in addition to the query volume, and qualities can be summed or averaged over a set of excess queries that are shared. In some implementations, the presence of higher-quality similar excess queries between two geographic features can offset, at least in part, dissimilar excess queries.

In some implementations, one of the reasons for determining similar geographic features can be to serve content (e.g., ads) to one or more of the similar geographic features based on those features' similarities to one or more other features. For example, an ad campaign that has been targeted to a city on the West Coast (e.g., San Francisco) may be very successful, e.g., leading to significant numbers of impressions, clicks and conversions. In light of the successful campaign, advertisers may want to target the same or similar content (e.g., ads) to other similar cities. For example, if an ad campaign related to high-tech medical products is popular ads in the San Francisco area, e.g., based on user reactions to the ad, then the advertisers may want to run the same ad campaign in Boston. San Francisco and Boston may be determined to be similar geographic features (e.g., cities), for example, based on analysis performed by the query analysis subsystem 120.

In another example, users in the San Francisco area may submit a higher than average number of queries for Yosemite, as determined by excess query counts for queries that include Yosemite as a search term. In an effort to reach a higher population of users interested in Yosemite, publishers and advertisers can target Yosemite-related content, including ads, to users in geographic features (e.g., other cities) that are similar to the San Francisco area. The targeting to similar cities can include, for example, Yosemite-related ads (e.g., hotels and activities in the Yosemite area) and content. In the case of content, Yosemite-related content can be ranked higher in a user's set of search results. In the case of ads, for example, the relevancy of an ad can be boosted, increasing the possibility that a Yosemite-related ad is selected for an ad impression.

The description that follows describes methods that can be performed to facilitate identification of excess queries for multiple geographic features, and to use the excess queries to identify similar geographic features. These processes can be performed on any number of queries and geographic features, as well as the time periods over which the queries were received from users associated with the geographic features.

Figure 4:
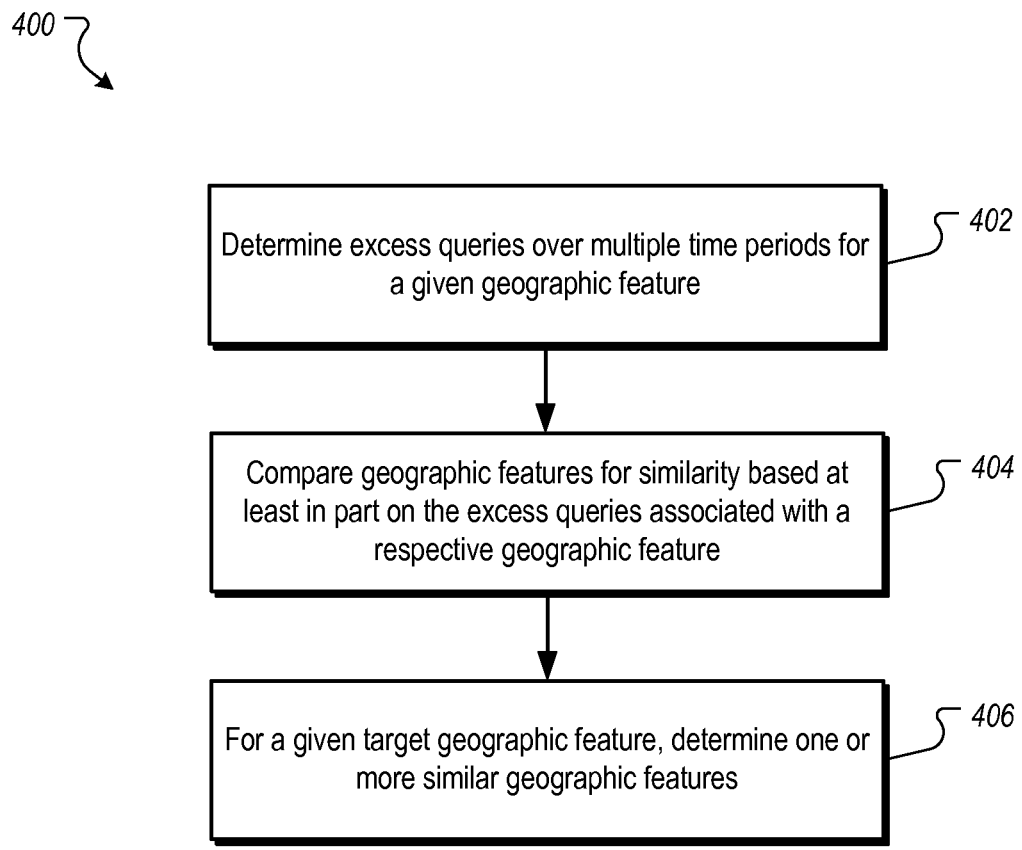
FIG. 4 is a flow chart of an example process for determining similar geographic features.

FIG. 4 is a flow chart of an example process 400 for identifying similar geographic features. The process 400 can be implemented, for example, by the query analysis subsystem 120 and/or the search system 110 of FIG. 1. In some implementations, the query analysis subsystem 120 is a data processing apparatus that includes one or more processors that are configured to perform actions of the process 400. In some implementations, a computer readable medium can include instructions that, when executed by a computer, cause the computer to perform actions of the process 400.

Excess queries are determined over multiple time periods for a given geographic feature (402). As an example, the query analysis subsystem 120 can use the search log data 202 to determine the excess queries for City A (e.g., San Francisco), as shown in the data table 302a (see FIG. 3). The data table 302a shows excess queries for ten queries and four time periods, but additional excess queries can be determined for several other queries and time periods for the geographic feature.

Excess queries for other geographic features over the same and/or different multiple time periods can be determined (e.g., by the query analysis subsystem 120). For example, referring to FIG. 3, the query analysis subsystem 120 can determine excess queries for Cities B and C, as shown in data tables 302b-302c. In this example, the queries and time periods for the Cities A, B and C are the same, namely using the queries $Q_1$ through $Q_{10}$ and the time periods 1-4. The query analysis subsystem 120 can also determine excess queries for other queries and time periods for the Cities B and C, as well as excess queries for many other geographic features.

Geographic features are compared for similarity based at least in part on the excess queries associated with a respective geographic feature (404). For example, referring to FIG. 3, the query analysis subsystem 120 can compare the excess queries for the Cities B and C (e.g., in the data tables 302b and 302c) to the excess queries for City A (e.g., in the data table 302a). The comparison can include comparing each individual excess query count for a given query (e.g., one of the queries $Q_1$ through $Q_{10}$) and time period (e.g., one of the time periods 1-4) for a city to the same query and time period of another city. Alternately, the comparison can examine clusters of query terms (e.g., clustered according to semantics or meaning) and compare clusters' weights across cities, for example.

In some implementations, comparing geographic features for similarity can include treating the geographic features' excess queries as two-dimensional vectors. For example, City A's excess queries in the data table 302a can be treated as a two-dimensional vector, where queries serve as one dimension and time periods serve as another dimension. City B's and City C's excess queries in the data tables 302b and 302c, respectively, can also be treated as two-dimensional vectors. To compare geographic features for similarity, cosine distances can be computed using the two-dimensional vectors for Cities A, B and C. Other mathematical models and/or correlation techniques can be used in other implementations to determine similar geographic features based, at least in part, on excess queries.

For a given target geographic feature, one or more similar geographic features are determined (406). For example, referring to FIG. 3, the query analysis subsystem 120 can determine City B to be a similar geographic feature to City A because of the similar excess query counts for the queries $Q_5$ and $Q_8$. In some implementations, similarity thresholds can be used in determining similar geographic features. For example, for the query analysis subsystem 120 to determine that City B is a similar geographic feature to City A, at least a minimum number of excess query counts must be shared between the cities. In some implementations, when dissimilarity thresholds are used in determining similar geographic features, the query analysis subsystem 120 can determine that geographic features (e.g., Cities A and C) are not similar if a minimum or threshold number of dissimilar excess query counts exists. Otherwise, if less than a dissimilarity threshold number of dissimilar excess query counts exist in addition to at least a similarity threshold number of similar excess query counts, then the query analysis subsystem 120 can determine that the geographic features are similar. In some implementations, if two-dimensional vectors are used for comparing geographic features, the smallest cosine distances can identify the closest cities, and thus similar cities.

Figure 5:
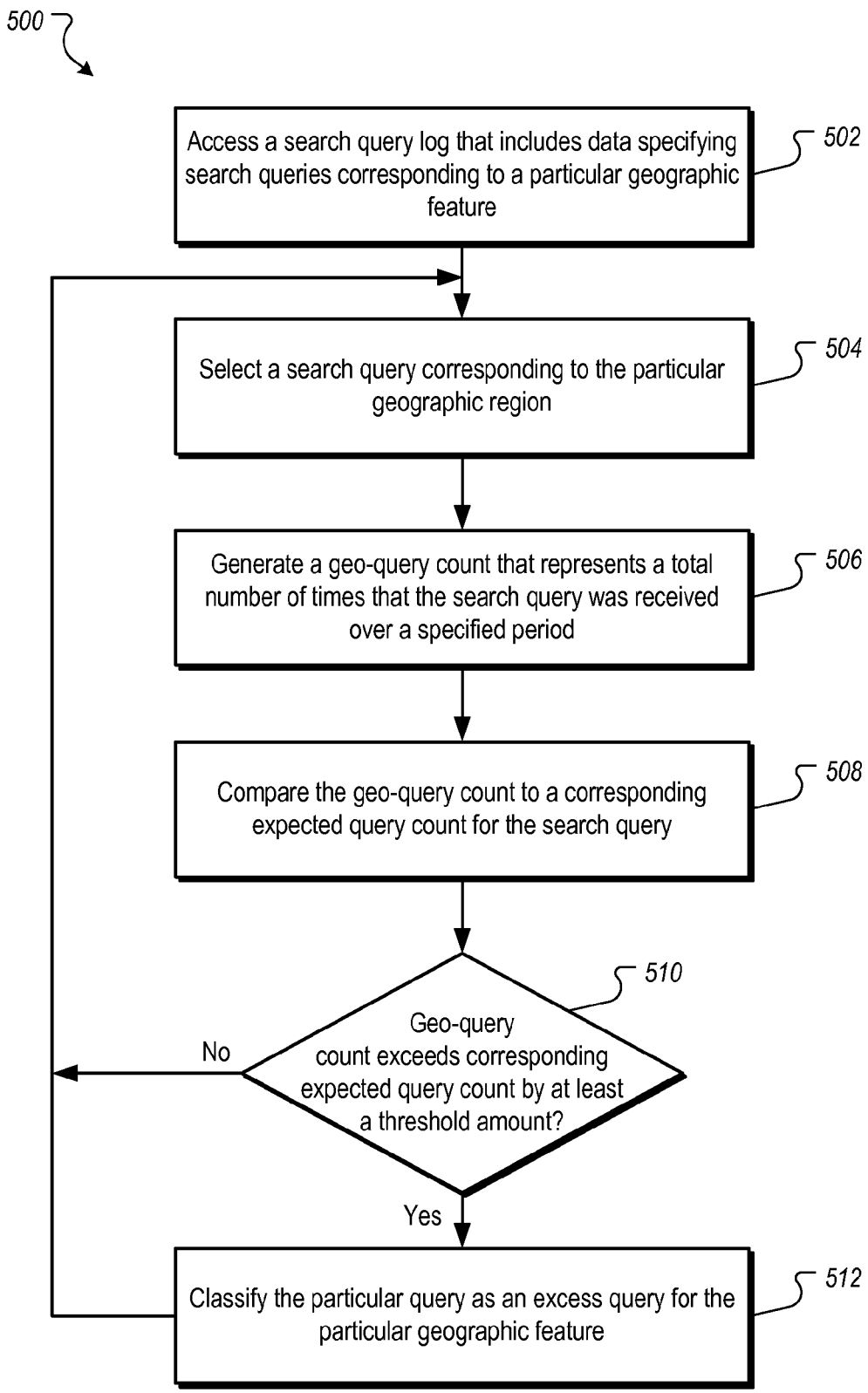
FIG. 5 is a flow chart of an example process for determining excess queries.

FIG. 5 is a flow chart of an example process 500 for identifying excess queries. The process 500 can be implemented, for example, by the query analysis subsystem 120 and/or the search system 110 of FIG. 1.

A search query log that includes data specifying search queries corresponding to a particular geographic feature is accessed (502). The geographic feature defines a location. As an example, the query analysis subsystem 120 can access information for search queries for a particular geographic feature (e.g., San Francisco).

A search query corresponding to the particular geographic region is selected (504). For example, referring to FIG. 2A, the query analysis subsystem 120 can select one of the queries $(Q_1$-$Q_i)$ (e.g., the query $Q_1$) from the search log data 202.

A geo-query count is generated that represents a total number of times that the search query was received over a specified period (506). As described above, the geo-query count for a search query represents a total number of times that the search query was received from the current geographic feature (e.g., San Francisco), for example, over a specified period (e.g., one or more hours, days, weeks, etc.). For example, the query analysis subsystem 120 can compute the geo-query count based on a number of instances of the search query in the search query log 202 that have the geographic identifier corresponding to the particular region (e.g., San Francisco). Referring to FIG. 2B, for example, the query analysis subsystem 120 can store the geo-query count in the actual query count column 216. For example, the geo-query count for the query $Q_1$, as shown in the actual query count column 216, is 7,000.

In some implementations, the geo-query count can also be obtained from the search query log 202. For example, the search query log 202 can include a reference to the search query and a value representing a number of times that the search query was received from user devices in the specified geographic region and/or other geographic regions.

The geo-query count is compared to a corresponding expected query count for the search query (508). For example, the query analysis subsystem 120 can compare the geo-query count for the query $Q_1$, (e.g., 7,000, as shown in the actual query count column 216) to the expected query count for the same query $Q_1$, (e.g., 10,000, as shown in the expected query count column 218).

In some implementations, the expected query count is a baseline number of times that the query is expected to be received, over the specified period, from user devices located in the specified geographic region (e.g., the San Francisco area). As described above, the expected query count for a query can be computed based on a query share for the query and a total number of queries that were received, over the specified period, from user devices located in (or corresponding to) the specified geographic region. In various embodiments herein, in order to obtain the benefits of such embodiments, the users of the devices may have to select participation and/or install an application such that location and/or other information from the user devices are available.

A determination is made whether the geo-query count exceeds the corresponding expected query count by at least a threshold amount (510). For example, the query analysis subsystem 120 can determine whether the geo-query count (e.g., 7,000) for the query $Q_1$ exceeds the expected query count (e.g., 10,000) for the same query $Q_1$. If geo-query count does not exceed the corresponding expected query count by at least a threshold amount, then the next search query is selected (504).

In response to a positive determination, the particular search query is classified as an excess query for the particular location (512). In some implementations, classifying the search query as an excess query for the particular geographic feature includes storage of the excess query count and/or a designation that the query is an excess query. The process 500 can continue for other queries when the next query is selected (504).

Figure 6:
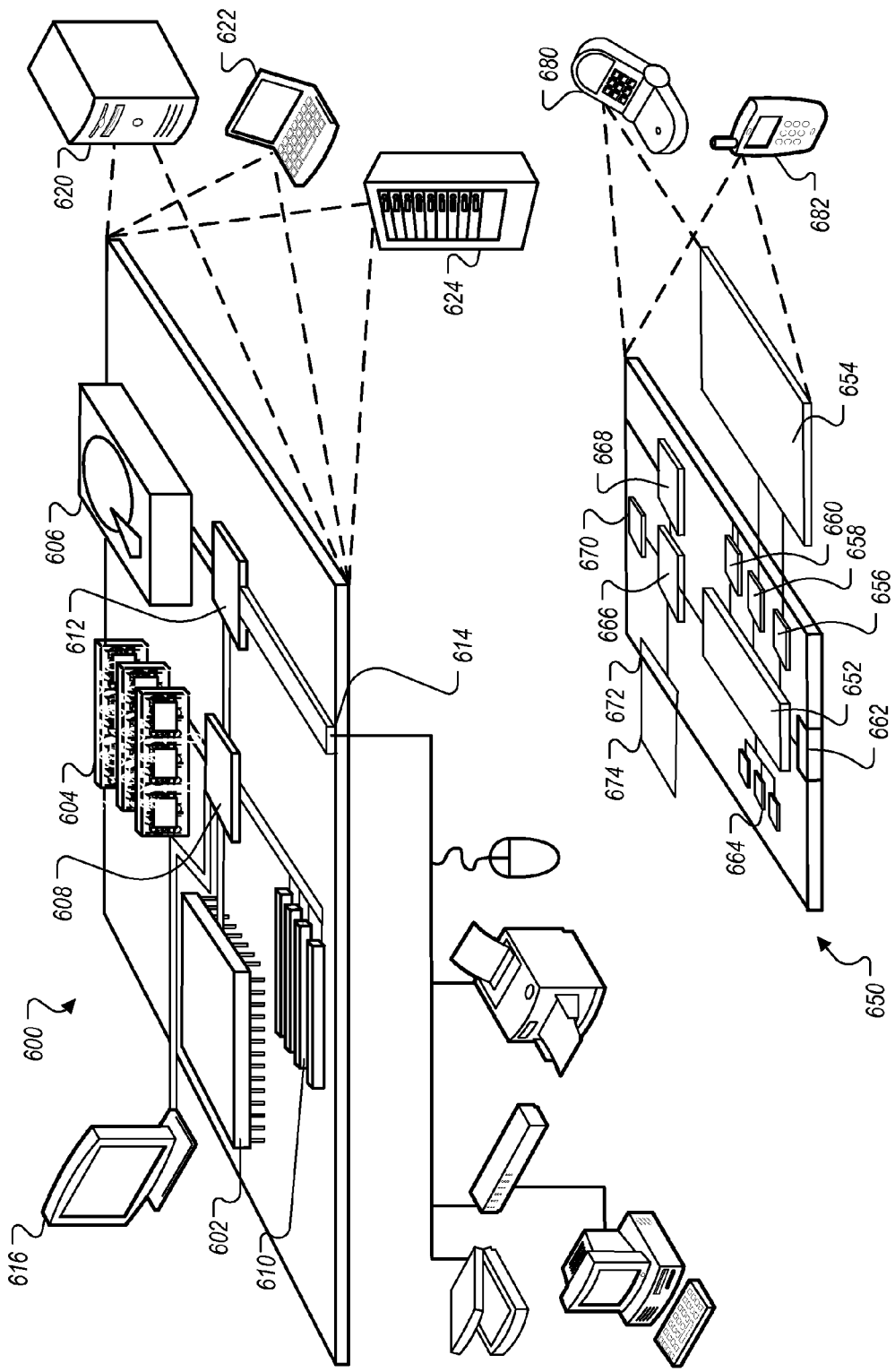
FIG. 6 is a block diagram of computing devices that may be used to implement the systems and methods described in this document.

FIG. 6 is a block diagram of computing devices 600, 650 that may be used to implement the systems and methods described in this document. The computing devices 600, 650 may be implemented as one or more clients or one or more servers, or combinations of clients and servers. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a computer-readable medium. In one implementation, the memory 604 is a volatile memory unit or units. In another implementation, the memory 604 is a non-volatile memory unit or units.

The storage device 606 is capable of providing mass storage for the computing device 600. In one implementation, the storage device 606 is a computer-readable medium. In various different implementations, the storage device 606 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of duties is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can process instructions for execution within the computing device 650, including instructions stored in the memory 664. The processor may also include separate analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD display or an OLED display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication (e.g., via a docking procedure) or for wireless communication (e.g., via Bluetooth or other such technologies).

The memory 664 stores information within the computing device 650. In one implementation, the memory 664 is a computer-readable medium. In one implementation, the memory 664 is a volatile memory unit or units. In another implementation, the memory 664 is a non-volatile memory unit or units. Expansion memory 674 may also be provided and connected to device 650 through expansion interface 672, which may include, for example, a SIMM card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS receiver module 670 may provide additional wireless data to device 650, which may be used as appropriate by applications running on device 650.

Device 650 may also communication audibly using audio codec 660, which may receive spoken information from a user and convert it to usable digital information. Audio codex 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by a data processing apparatus, the method comprising:
    determining excess queries over multiple time periods for two or more given geographic features, where each geographic feature defines a location;
    comparing the two or more geographic features for similarity based at least in part on the determined excess queries associated with each geographic feature;
    for a given target geographic feature, determining one or more similar geographic features based on the comparing; and
    relating electronically the target geographic feature and the one or more similar geographic features as a set of similar geographic features,
    wherein determining the excess queries over the multiple time periods for the two or more given geographic features includes:
    generating a geo-query count that represents a total number of times that the search query was received over a specified period;
    obtaining a corresponding expected query count for the at least one of the search queries by accessing a search query log that includes data specifying search queries corresponding to a particular geographic feature;
    comparing the geo-query count to the corresponding expected query count for the at least one of the search queries, the corresponding expected query count being a baseline number of times that the query is expected to be received; and
    in response to determining that the geo-query count of the at least one of the search queries exceeds the corresponding expected query count by at least a threshold amount, classifying the at least one of the search queries as an excess query for the particular geographic feature.

2. The method of claim 1 where each geographic feature is a city.

3. The method of claim 1, wherein the corresponding expected query count for the at least one of the search queries is obtained by accessing a search query log that includes data specifying search queries corresponding to a particular geographic feature.

4. The method of claim 1 where the multiple time periods are separated in time by one or more intervals.

5. The method of claim 1 where comparing the two or more geographic features for similarity includes determining a number of excess queries in common between two geographic features.

6. The method of claim 1 where comparing the two or more geographic features for similarity includes determining a similarity threshold equal to a minimum number of excess queries that must be shared between two geographic features in order to find similarity, and where determining one or more similar geographic features based on the comparing includes determining one or more geographic features that share a number of excess queries that is greater than the similarity threshold for the target geographic feature.

7. The method of claim 1 where comparing the two or more geographic features for similarity includes determining a quality of the excess queries shared by the given target geographic feature and a candidate geographic feature.

8. The method of claim 7 where the quality is measured based on at least of a volume of queries associated with the excess queries or semantic clustering of terms by meaning.

9. The method of claim 1 where determining one or more similar geographic features includes comparing a number of shared excess queries and a number of dissimilar excess queries for the target geographic feature and a candidate geographic feature, and where comparing a number of dissimilar excess queries includes determining if the number of dissimilar excess queries exceeds a dissimilarity threshold, and determining that the target geographic feature and candidate geographic feature are not similar if the number of dissimilar excess queries exceeds the dissimilarity threshold.

10. The method of claim 1 further comprising:
    attributing information associated with one geographic feature with one of the one or more similar geographic features; and
    using the attributed information to target content to the similar geographic feature.

11. The method of claim 10 where the information is at least one of targeting information or a label associated with the one geographic feature.

12. The method of claim 10 where the multiple time periods evaluated are the same for each geographic feature.

13. The method of claim 1 where determining excess queries over multiple time periods for the given geographic feature further includes:
    for each time period, determining a query volume for every query in every geographic feature;
    for every query, calculating a volume of each query across all geographic features;
    for every geographic feature, calculating a query volume across all queries;
    calculating a total volume of queries; and
    calculating an excess for each query in each geographic feature.

14. The method of claim 13 further comprising creating two dimensional vectors based on the excess queries per geographic feature and using the two dimensional vectors to determine similar geographic features.

15. A non-transitory machine-readable medium comprising instructions stored therein, which when executed by a processor, causes the processor to perform operations comprising:
    determining excess queries over multiple time periods for two or more given geographic features, where each geographic feature defines a location;
    comparing the two or more geographic features for similarity based at least in part on the determined excess queries associated with each geographic feature;
    for a given target geographic feature, determining one or more similar geographic features based on the comparing; and
    relating electronically the target geographic feature and the one or more similar geographic features as a set of similar geographic features,
    wherein determining the excess queries over the multiple time periods for the two or more given geographic features includes:
    generating a geo-query count that represents a total number of times that the search query was received over a specified period;
    obtaining a corresponding expected query count for the at least one of the search queries by accessing a search query log that includes data specifying search queries corresponding to a particular geographic feature;

comparing the geo-query count to the corresponding expected query count for the at least one of the search queries, the corresponding expected query count being a baseline number of times that the query is expected to be received; and in response to determining that the geo-query count of the at least one of the search queries exceeds the corresponding expected query count by at least a threshold amount, classifying the at least one of the search queries as an excess query for the particular geographic feature.

16. The non-transitory machine-readable medium of claim 15 where the instructions for comparing the two or more geographic features for similarity includes instructions for determining a number of excess queries in common between two geographic features.

17. The non-transitory machine-readable medium of claim 15 where the instructions for comparing the two or more geographic features for similarity includes instructions for determining a similarity threshold equal to a minimum number of excess queries that must be shared between two geographic features in order to find similarity, and where the instructions for determining one or more similar geographic features based on the comparing includes instructions for determining one or more geographic features that share a number of excess queries that is greater than the similarity threshold for the target geographic feature.

18. A system, comprising:
one or more processors; and
a non-transitory machine-readable medium comprising instructions stored therein, which when executed by the processors, cause the processors to perform operations comprising:
determining excess queries over multiple time periods for two or more given geographic features, where each geographic feature defines a location;
comparing the two or more geographic features for similarity based at least in part on the determined excess queries associated with each geographic feature;
for a given target geographic feature, determining one or more similar geographic features based on the comparing; and
relating electronically the target geographic feature and the one or more similar geographic features as a set of similar geographic features,
wherein determining the excess queries over the multiple time periods for the two or more given geographic features includes:
generating a geo-query count that represents a total number of times that the search query was received over a specified period;
obtaining a corresponding expected query count for the at least one of the search queries by accessing a search query log that includes data specifying search queries corresponding to a particular geographic feature;
comparing the geo-query count to the corresponding expected query count for the at least one of the search queries, the corresponding expected query count being a baseline number of times that the query is expected to be received; and
in response to determining that the geo-query count of the at least one of the search queries exceeds the corresponding expected query count by at least a threshold amount, classifying the at least one of the search queries as an excess query for the particular geographic feature.

19. The system of claim 18 where the operations for comparing the two or more geographic features for similarity include determining a number of excess queries in common between two geographic features.

20. The system of claim 18 where the operations for comparing the two or more geographic features for similarity include determining a similarity threshold equal to a minimum number of excess queries that must be shared between two geographic features in order to find similarity, and where the instructions for determining one or more similar geographic features based on the comparing includes instructions for determining one or more geographic features that share a number of excess queries that is greater than the similarity threshold for the target geographic feature.

* * * * *